United States Patent
Jepsen et al.

(10) Patent No.: US 9,336,729 B2
(45) Date of Patent: May 10, 2016

(54) OPTICAL CONFIGURATIONS IN A TILEABLE DISPLAY APPARATUS

(71) Applicant: Google Inc., Mountain View, CA (US)

(72) Inventors: Mary Lou Jepsen, Sausalito, CA (US); Adam E. Norton, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/227,915

(22) Filed: Mar. 27, 2014

(65) Prior Publication Data
US 2015/0023051 A1    Jan. 22, 2015

Related U.S. Application Data

(60) Provisional application No. 61/856,462, filed on Jul. 19, 2013.

(51) Int. Cl.
*G09G 3/20*    (2006.01)
*G09G 3/34*    (2006.01)
(Continued)

(52) U.S. Cl.
CPC ............ *G09G 3/3426* (2013.01); *G02B 6/0005* (2013.01); *G09G 3/20* (2013.01); *G09G 3/32* (2013.01); *G02F 1/133603* (2013.01); *G09G 2300/026* (2013.01); *G09G 2310/0232* (2013.01)

(58) Field of Classification Search
CPC . G09G 3/20; G09G 2300/026; G09G 3/3426; G09G 3/32; G09G 2310/0232; G02B 6/0005; G02F 1/1336; G02F 1/13336; G02F 1/133602; G02F 1/133603; G02F 1/133604; G02F 2201/123
See application file for complete search history.

(56) References Cited

U.S. PATENT DOCUMENTS

| 5,889,568 A | * | 3/1999 | Seraphim | ............ | G02F 1/13336 349/1 |
| 6,005,649 A | * | 12/1999 | Krusius | ............... | G02F 1/13336 349/20 |

(Continued)

FOREIGN PATENT DOCUMENTS

| GB | 2373620 A | 9/2002 |
| JP | 2007-519330 A | 7/2007 |

(Continued)

OTHER PUBLICATIONS

PCT/US2014/042708, International Search Report and Written Opinion of the International Searching Authority, mail date Oct. 28, 2014, 10 pages.

(Continued)

*Primary Examiner* — Bao Q Truong
(74) *Attorney, Agent, or Firm* — Blakely Sokoloff Taylor & Zafman LLP

(57) ABSTRACT

A display apparatus including a screen layer for displaying a unified image to a viewer and an illumination layer having an array of light sources. Each light source emits a light beam. An array of optical elements, each coupled to a corresponding light source in the array of light sources, is disposed between the screen layer and the illumination layer. The display layer includes a matrix of pixlets and a spacing region disposed between the pixlets in the matrix, wherein the array of light sources emit their light beams through the array of optical elements, wherein each optical element is configured to shape the received light beam into a divergent projection beam having a limited angular spread to project sub-images displayed by the pixlets as magnified sub-images on the backside of the screen layer, the magnified sub-images to combine to form the unified image that is substantially seamless.

30 Claims, 9 Drawing Sheets

(51) Int. Cl.
*F21V 8/00* (2006.01)
*G09G 3/32* (2016.01)
*G02F 1/1335* (2006.01)

(56) References Cited

U.S. PATENT DOCUMENTS

| | | | |
|---|---|---|---|
| 6,377,306 B1 | 4/2002 | Johnson et al. | |
| 6,727,864 B1 | 4/2004 | Johnson et al. | |
| 7,145,611 B2* | 12/2006 | Dubin | G02F 1/13336 349/5 |
| 7,239,367 B2* | 7/2007 | Jin | G02F 1/13336 345/1.3 |
| 7,339,625 B2 | 3/2008 | Matthys et al. | |
| 7,495,638 B2 | 2/2009 | Lamvik et al. | |
| 7,742,120 B2 | 6/2010 | Bayley et al. | |
| 7,744,289 B2 | 6/2010 | Hu | |
| 9,030,375 B2 | 5/2015 | Curtis et al. | |
| 9,123,266 B2 | 9/2015 | Bastani et al. | |
| 2003/0117545 A1 | 6/2003 | Coker et al. | |
| 2003/0184703 A1 | 10/2003 | Greene et al. | |
| 2006/0012733 A1 | 1/2006 | Jin et al. | |
| 2006/0097957 A1 | 5/2006 | Ben-Shalom | |
| 2006/0227085 A1 | 10/2006 | Boldt et al. | |
| 2009/0278121 A1 | 11/2009 | Kakkad et al. | |
| 2010/0177261 A1 | 7/2010 | Jin et al. | |
| 2010/0265160 A1 | 10/2010 | Hajjar | |
| 2010/0265723 A1 | 10/2010 | Zhou | |
| 2011/0298763 A1 | 12/2011 | Mahajan | |
| 2013/0082936 A1 | 4/2013 | Islamkulov et al. | |
| 2013/0093646 A1 | 4/2013 | Curtis et al. | |
| 2015/0022727 A1 | 1/2015 | Jepsen | |
| 2015/0022754 A1* | 1/2015 | Jepsen | G02F 1/1336 349/61 |
| 2015/0097837 A1 | 4/2015 | Jepsen et al. | |
| 2015/0097853 A1 | 4/2015 | Bastani et al. | |
| 2015/0153023 A1 | 6/2015 | Jepsen et al. | |

FOREIGN PATENT DOCUMENTS

| | | |
|---|---|---|
| KR | 10-2006-0040166 | 5/2006 |
| TW | 201018992 A | 5/2010 |
| TW | 201033959 A | 9/2010 |
| TW | 201118029 A | 6/2011 |

OTHER PUBLICATIONS

PCT/US2014/042710, International Search Report and Written Opinion of the International Searching Authority, mail date Oct. 28, 2014, 11 pages.
PCT/US2014/042552, International Search Report and Written Opinion of the International Searching Authority, mail date Oct. 28, 2014, 10 pages.
TW 103122688—First Taiwan Office Action with English translation, issued Jul. 28, 2015, 11 pages.
TW 103122692—First Taiwan Office Action with English translation, issued Jul. 29, 2015, 12 pages.
PCT/US2014/042708, International Preliminary Report on Patentability, mailed Jan. 28, 2016, 9 pages.
PCT/US2014/042552, International Preliminary Report on Patentability, mailed Jan. 28, 2016, 9 pages.
PCT/US2014/042710, International Preliminary Report on Patentability, mailed Jan. 28, 2016, 10 pages.
TW 103122691—First Office Action with English translation, issued Jan. 20, 2016, 15 pages.

* cited by examiner

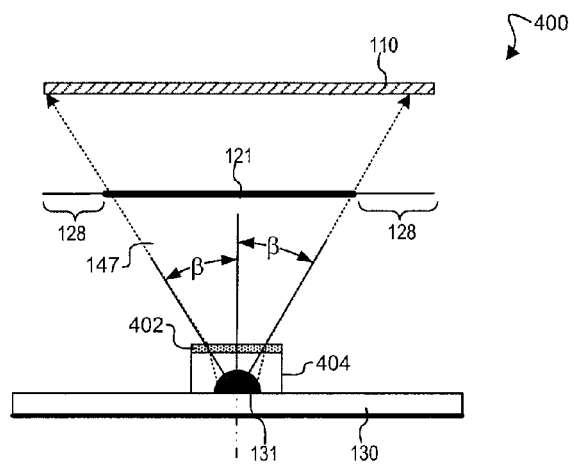
*Fig. 5A*
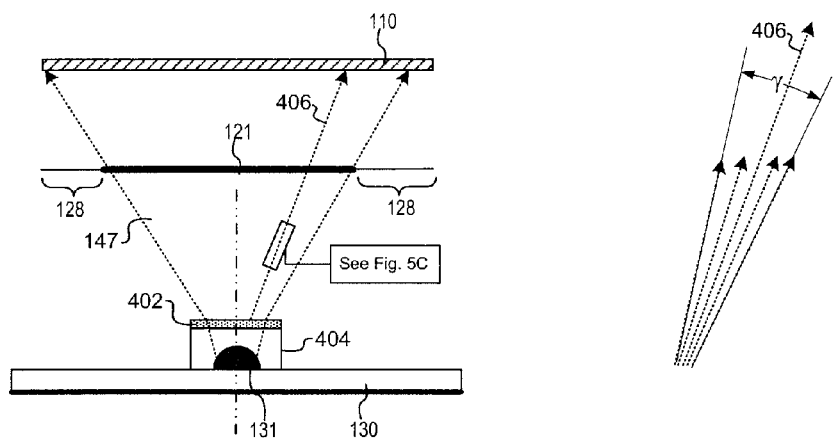
*Fig. 5B*  *Fig. 5C*

OPTICAL CONFIGURATIONS IN A TILEABLE DISPLAY APPARATUS

CROSS-REFERENCE TO RELATED APPLICATIONS

This application claims priority under 35 U.S.C. §119(e) to U.S. Provisional Application No. 61/856,462, filed 19 Jul. 2013. The contents of the priority provisional application in their entirety are incorporated herein by reference.

TECHNICAL FIELD

This disclosure relates generally to displays, and in particular, but not exclusively, relates to tileable displays.

BACKGROUND

Large displays can be prohibitively expensive because the cost to manufacture display panels increases exponentially with display area. This exponential cost increase arises from the increased complexity of large single-panel displays, the decrease in yields associated with large displays (a greater number of components must be defect-free for large displays), and increased shipping, delivery, and setup costs. Tiling smaller display panels to form larger multi-panel displays can help reduce many of the costs associated with large single-panel displays.

Tiling multiple smaller, less expensive display panels together can result in a large multi-panel display that can be used as a large wall display. The individual images displayed by each display panel can constitute a sub-portion of the larger overall image collectively displayed by the multi-panel display. While a multi-panel display can reduce costs, it has a major visual draw-back. Specifically, bezel regions that surround the displays put seams or cracks in the overall image displayed by the multi-panel display. These seams are distracting to viewers and detract from the overall visual experience. Furthermore, when many high-resolution displays are used to make a large multi-panel display, the overall image is extremely high resolution, which creates bandwidth and processing challenges for driving image content (especially video) to the extremely high resolution display.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 5A is partial cross-sectional view of the embodiment of a display apparatus of FIG. 4A illustrating its operation.

FIG. 5B is a partial cross-sectional view of an embodiment of a display apparatus of FIG. 4A including a uniforming optical element.

FIG. 5C is an enlargement of the designated area in FIG. 5B.

DETAILED DESCRIPTION OF THE ILLUSTRATED EMBODIMENTS

Embodiments of an apparatus and a system of tileable displays are described. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a described feature, structure, or characteristic is included in at least one embodiment. Thus, appearances of the phrases "in one embodiment" or "in an embodiment" in this specification do not necessarily all refer to the same embodiment. Furthermore, the described features, structures, or characteristics can be combined in any suitable manner in one or more embodiments.

Figure 1A:
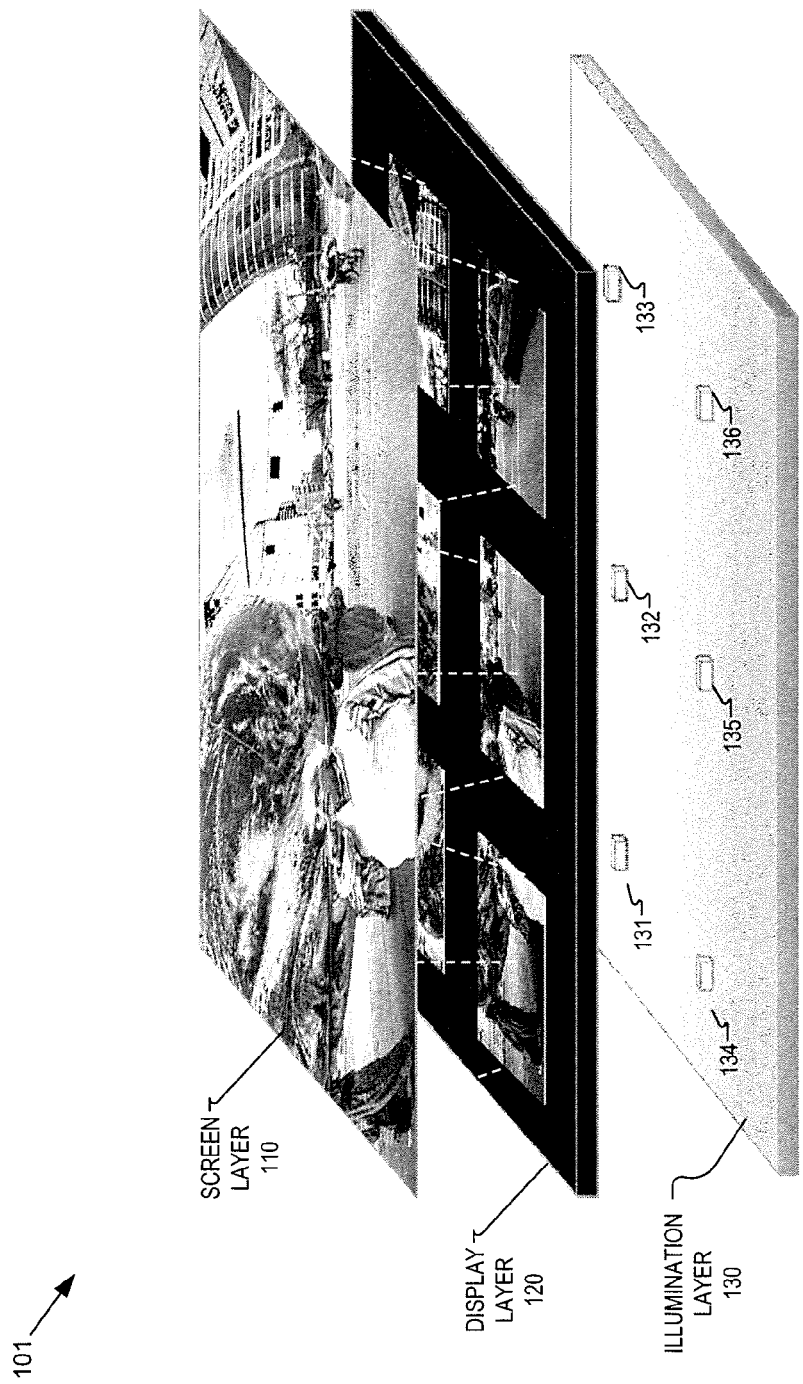
FIGS. 1A-1C are two perspective views and a cross-sectional view, respectively, of an embodiment of a display apparatus that includes a display layer disposed between a screen layer and an illumination layer.
Figure 1B:
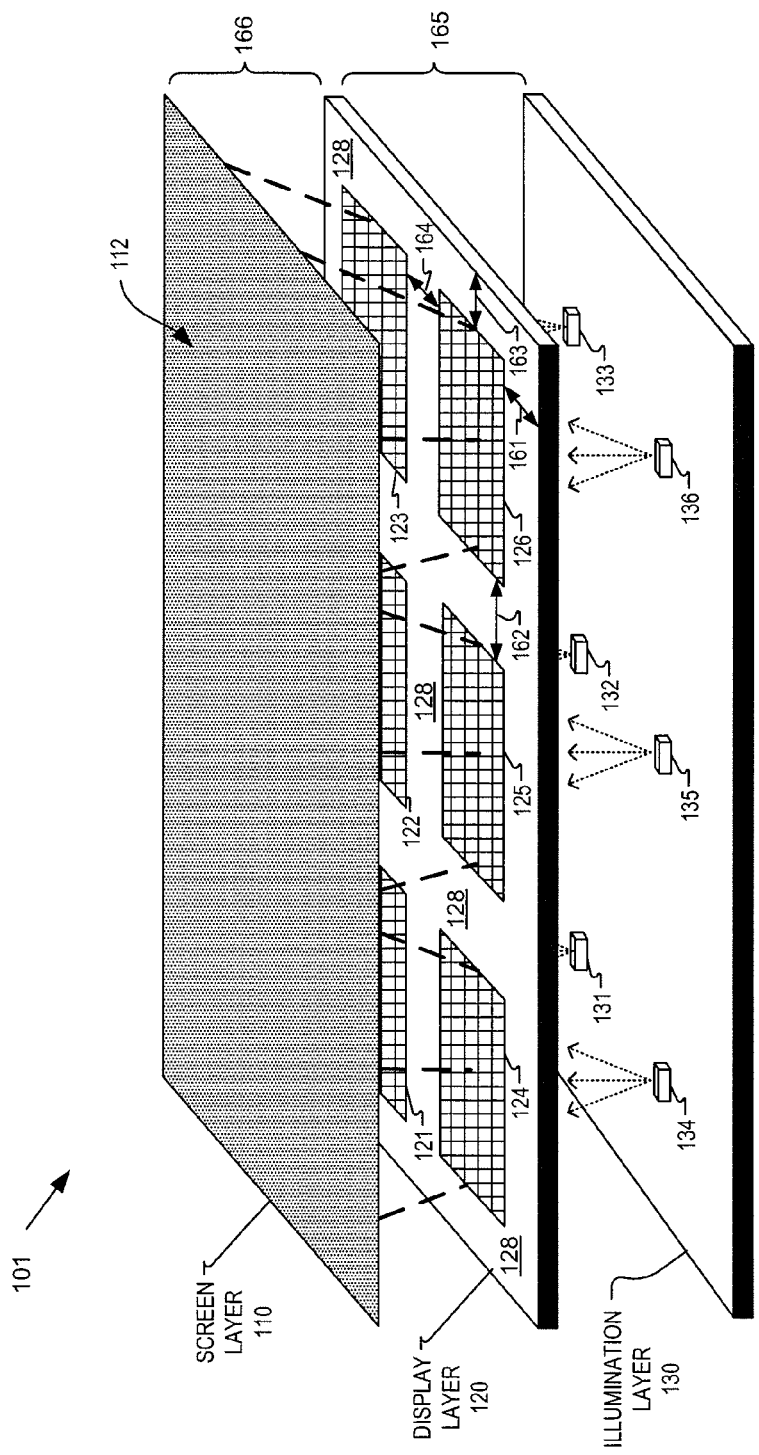
Figure 1C:
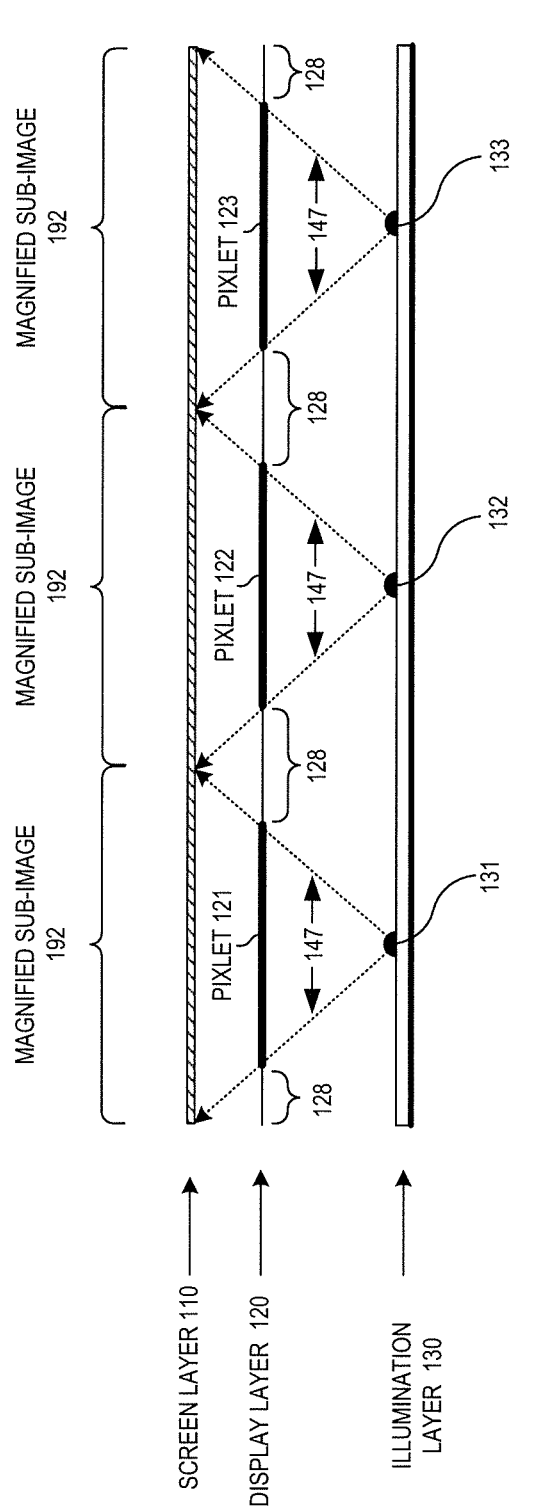

FIGS. 1A-1C illustrate an embodiment of a display apparatus 101 that includes a display layer 120 disposed between a screen layer 110 and an illumination layer 130. While FIGS. 1A-1C do not illustrate intervening layers between the layers 110, 120, and 130, it should be appreciated that embodiments can include various intervening optical and structural layers, such as lens arrays, optical offsets, and transparent substrates to provide mechanical rigidity.

FIG. 1A shows that illumination layer 130 includes an array of light sources 131, 132, 133, 134, 135, and 136. Each light source in the array of light sources illuminates a corresponding pixlet to project the sub-image of the pixlet onto the screen layer 110 as a unified image. In the embodiment illustrated in FIG. 1A, each pixlet includes a transmissive pixel array with a plurality of individual transmissive display pixels arranged in rows and columns (e.g., 100 pixels by 100 pixels in one embodiment). Each pixlet displays a part of an overall image and, when coupled with a light source and a screen as further described below, projects a magnified version of its part of the overall image onto the screen.

FIG. 1B also shows that illumination layer 130 includes light sources 131, 132, 133, 134, 135, and 136 disposed on a common plane of illumination layer 130. In one embodiment, each light source can be a laser, but in other embodiments, each light source can be a light-emitting-diode ("LED") that emits light from a relatively small emission aperture. Generally, the aperture size selected will depend on a tradeoff between brightness and resolution, taking into account the size of the pixlet with which the light source is coupled. For example, LEDs with an emission aperture of 150-300 microns can be used in one embodiment, but in other embodiments smaller emission apertures (e.g., less than 150 microns) or larger aperture sizes (greater than 1 mm square, for example 1.1 mm in one particular embodiment) can be used. The LED can emit white light. In still other embodiments, other technologies can be used as light sources. In one embodiment, each light source is an aperture emitting light from a light integration cavity shared by at least one other light source.

Display layer 120 includes a matrix of pixlets 121, 122, 123, 124, 125, and 126. The illustrated embodiment is a 2×3 matrix of pixlets 121-126, but other display layers can have different numbers and/or arrangements of pixlets. In the illustrated embodiment, each pixlet in the matrix of pixlets is oriented on a common plane of display layer 120. The pixlets can be liquid-crystal-displays ("LCDs") that can be color LCDs or monochromatic LCDs. In one embodiment, each pixlet is an independent display array separated from adjacent pixlets by spacing region 128. In one embodiment, each pixlet measures 20×20 mm. The pitch between each pixlet in the matrix can be the same. In other words, the distance between a center of one pixlet and the center of its adjacent pixlets can be the same distance. In the illustrated embodiment, each light source in the array of light sources has a one-to-one correspondence with a pixlet. For example, light source 131 corresponds to pixlet 121, light source 132 corresponds to pixlet 122, light source 133 corresponds to pixlet 123, and so on. Also in the illustrated embodiment, each light source is centered under its respective corresponding pixlet.

Display layer 120 also includes spacing region 128 surrounding pixlets 121-126. In FIG. 1B, pixlet 126 is adjacent to pixlets 123 and 125. Pixlet 126 is spaced by dimension 162 from pixlet 125 and spaced by dimension 164 from pixlet 123. Dimensions 162 and 164 can be considered "internal spacing" and need not be the same distance, but are the same in some embodiments. Pixlet 126 is also spaced by dimensions 161 and 163 from edges of display layer 120. Dimensions 161 and 163 can be considered "external spacing" and need not be the same distance, bur are the same in some embodiments. In one embodiment, dimensions 161 and 163 are half of dimensions 162 and 164; in one example, dimensions 161 and 163 are both 2 mm and dimensions 162 and 164 are both 4 mm. In the illustrated embodiment, the internal spacing between pixlets is substantially greater than the pixel pitch (space between pixels) of pixels included in each pixlet.

In the embodiment of FIG. 1B, the magnified sub-images would each be the same size and be square-shaped. To generate same-sized magnified sub-images, in one embodiment display layer 120 and its pixlets 121-126 can be offset from light sources 131-136 by a fixed dimension 165 (In one embodiment, dimension 165 is 8 mm), but other embodiments can include the ability to adjust the spacing and angle between the illumination layer and display layer to adjust the magnification, and thus the size of the pixlet images, on the screen. This can compensate for thickness variation in the pixlet-to-screen distance, for example. The illumination layer can also be adjusted laterally relative to the display layer to align the edge of the image to the edge of the screen on each panel.

Spacing region 128 contains a backplane region that includes pixel logic for driving the pixels in the pixlets. One potential advantage of the architecture of display apparatus 101 is increasing space for additional circuitry in the backplane region. In one embodiment, the backplane region is used for memory-in-pixel logic. Giving the pixels memory can allow each pixel to be refreshed individually instead of refreshing each pixel in a row at every refresh interval (e.g., 60 frames per second). In one embodiment, the backplane region is used to assist in imaging processing. When display apparatus 101 is used in high-resolution large format displays, the additional image processing capacity can be useful for image signal processing, for example dividing an image into sub-images that are displayed by the pixlets. In another embodiment, the backplane region is used to embed image sensors. In one embodiment, the backplane region includes infrared image sensors for sensing 3D scene data in the display apparatus' environment.

FIG. 1C illustrates a cross-section of display apparatus 101. Each light source 131-136 is configured to emit a divergent projection beam 147 having a limited angular spread that is directed toward a specific corresponding pixlet in display layer 120. In an embodiment, divergent projection beam 147 can be substantially shaped as a cone (circular aperture) or an inverted pyramid (rectangle/square aperture). Additional optics can be disposed over each light source in the array of light sources to define the limited angular spread (e.g., 20-70 degrees) and/or cross-sectional shape of divergent projection beam 147 emitted from the light sources. The additional optics (including refractive and/or diffractive optics) can also increase brightness uniformity of the display light in divergent projection beam 147 so that the intensity of divergent projection beam 147 incident upon each pixel in a given pixlet is substantially similar.

In some embodiments not illustrated in FIG. 1C, divergent projection beams 147 from different light sources can overlap upon the spacing region 128 on the backside of display layer 120. In some embodiments, each pixlet is directly illuminated solely by one divergent projection beam from its corresponding light source, which can approximate a point source. In certain embodiments, a very small percentage of light from non-corresponding light sources can become indirectly incident upon a pixlet due to unabsorbed reflections of divergent projection beams 147 from the non-corresponding light sources. Spacing regions 128 and illumination layer 130 can be coated with light absorption coatings to decrease reflections from non-corresponding light sources from eventually becoming incident upon a pixlet that does not correspond with the light source. The limited angular spread of the light sources can be designed to ensure that divergent projection beams 147 only directly illuminates the pixlet that corresponds to a particular light source. In contrast, conventional LCD technology utilizes lamps (e.g., LEDs or cold-cathode-fluorescents) with a generally Lambertian light distribution and diffusive filters in an attempt to generate uniform and diffuse light for backlighting an LCD panel.

In operation, display light in a divergent projection beam 147 from a light source (e.g., light source 131) propagates toward its corresponding pixlet (e.g., pixlet 121). Each pixlet drives its pixels to display a sub-image on the pixlet so the display light that propagates through the pixlet includes the sub-image displayed by the pixlet. Since the light source generates the divergent projection beam 147 from a small aperture and the divergent projection beam 147 has a limited angular spread, the sub-image in the display light gets larger as it gets further away from the pixlet. Therefore, when the display light (including the sub-image) encounters screen layer 110, a magnified version of the sub-image is projected onto a backside of screen layer 110.

Screen layer 110 is offset from pixlets 121-126 by a fixed distance 166 to allow the sub-images to become larger as the display light (in divergent projection beams 147) propagates further from the pixlet that drove the sub-image. Therefore, fixed distance 166 can be one component of how large the magnification of the sub-images is. In one embodiment, fixed distance 166 is 2 mm. In one embodiment, each sub-image generated by pixlets 121-126 is magnified by 1.5×. In some embodiments each sub-image generated by each pixlets 121-126 is magnified by 1.05-1.25×. The offset by fixed distance 166 can be achieved by using a transparent intermediary (e.g., glass or plastic layers).

In one embodiment, screen layer 110 is fabricated of a matte material suitable for rear projection that is coated onto a transparent substrate that provides the offset by fixed distance 166. The backside of screen layer 110 is opposite a viewing side 112 of screen layer 110. Screen layer 110 can be made of a diffusion screen that presents the unified image on the viewing side 112 of screen layer 110 by scattering the display light in the divergent projection beams 147 (that includes the sub-images) from each of the pixlets 121-126. Screen layer 110 can be similar to those used in rear-projection systems.

Figure 2:
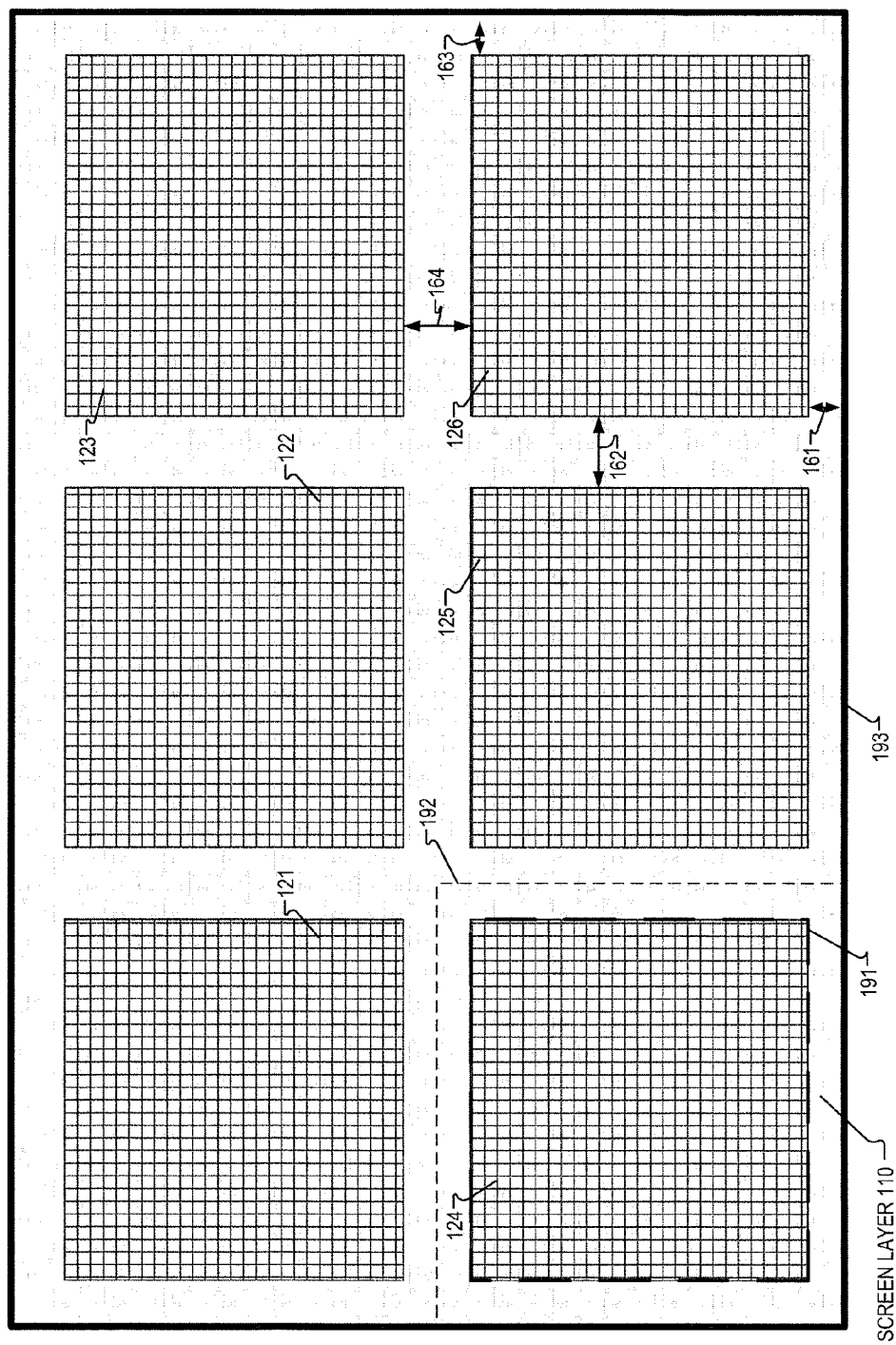
FIG. 2 is a semi-transparent plan view of an embodiment of a display apparatus looking through a screen layer to a display layer.

FIG. 2 shows a semi-transparent plan view of an embodiment of a display apparatus 101 looking through screen layer 110 to display layer 120. Display apparatus 101 can generate a unified image 193 using magnified sub-images 192 generated by light sources 131-136 and their corresponding pixlets 121-126. In FIG. 2, pixlet 124 generates a sub-image 191 that is projected (using the display light in the divergent projection beam 147 from light source 134) onto screen layer 110 as magnified sub-image 192. Although not illustrated, each pixlet 121, 122, 123, 125, and 126 can also project a magnified sub-image onto screen layer 110 that is the same size as magnified sub-image 192. These five magnified sub-images, combined with magnified sub-image 192, form unified image 193. And because the geometric alignment of the magnified sub-images would leave virtually no gap (if any) between the magnified sub-images, unified image 193 will be perceived as seamless by a viewer. The magnified sub-images on the backside of the screen layer 110 combine laterally to form unified image 193. Magnification of the sub-images allows the unified image to reach the edge of screen layer 110, while display layer 120 and illumination layer 130 can still include a mechanical bezel that offers rigidity and support for electrical connections, but that is out of sight to a viewer of display apparatus 101.

Figure 3:
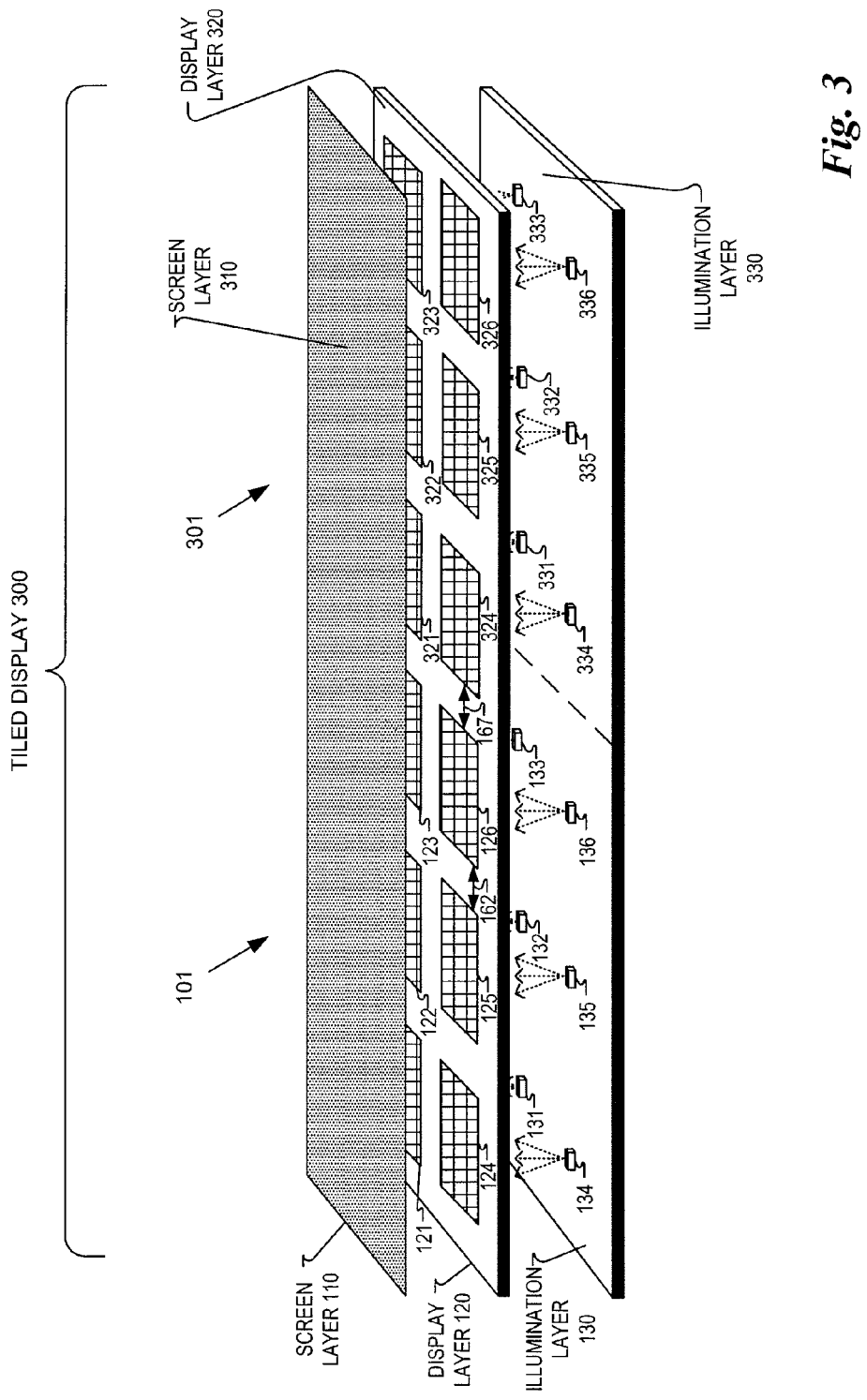
FIG. 3 shows an embodiment of a tiled display formed of more than one display apparatus tiled together.

FIG. 3 shows a pair of display apparatuses 101 and 301 tiled together to form an embodiment of a tiled display 300. Tiled display 300 displays an overall image that is a combination of a unified image (e.g., unified image 193) projected by display apparatus 101 and a unified image projected by display apparatus 301. In the illustrated embodiment, display apparatus 301 is substantially the same as display apparatus 101, but different reference numbers are used for discussion. Display apparatus 101 can be tiled together with other display apparatuses in a modular approach to building tiled display 300. In one embodiment, a self-healing adhesive is applied between screen layer 110 and screen layer 310. This adhesive will blend screen layer 110 and screen layer 310 to hide easily perceived seams between screen layers 110 and 310 in tiled display 300. In one embodiment, the self-healing adhesive is made of polymers. In another embodiment, a monolithic screen layer is disposed over display layer 120 and 320 so that the screen layer does not have a seam. Monolithic screen layers with appropriate mechanical fixtures can be sized to common tiled arrangements of multiple display apparatus 101 (e.g., 2×2, 3×3, 4×4). Third and fourth display apparatus that are the same as display apparatus 101 could be added to tiled display 300 to form a larger tiled display that is a 2×2 matrix of display apparatus 101 and that the larger display could have the same potential advantages as explained in association with tiled display 300. Of course, displays larger than a 2×2 matrix can also be formed.

In FIG. 3, dimension 167 is the same distance as dimension 162. This maintains the pitch between pixlets 126 and 324, as illustrated, and ensures that the edge of the magnified sub-image generated by light source 334 and pixlet 324 geometrically aligns with the edge of the magnified sub-image generated by light source 136 and pixlet 126. Similarly, the edge of the magnified sub-image generated by light source 331 and pixlet 321 geometrically aligns with the edge of the magnified sub-image generated by light source 133 and pixlet 123. In this way, the unified image projected on screen layer 310 aligns with the unified image projected on screen layer 110 to form the overall image displayed by tiled display 300.

Because the magnified sub-images, and therefore the unified images, of display apparatuses 101 and 301 are aligned at their edges on screen layer 110/310, the pixel pitch and density of the overall image can remain the same, even where display apparatuses 101 and 301 are coupled together. Hence, where traditional tiled displays have a distracting bezel where two display layers are coupled together, tiled display 300 can have an unperceivable seam because of the near-seamless visual integration of the unified images as the overall image on tiled display 300.

In some embodiments (not shown), mechanical structures can be added to each display apparatus 101 to facilitate the correct physical alignment of additional display apparatus. In one embodiment, electrical connectors that facilitate power and image signals are included in display apparatus 101 to facilitate modular construction of a tiled display using the display apparatus 101.

Figure 4A:
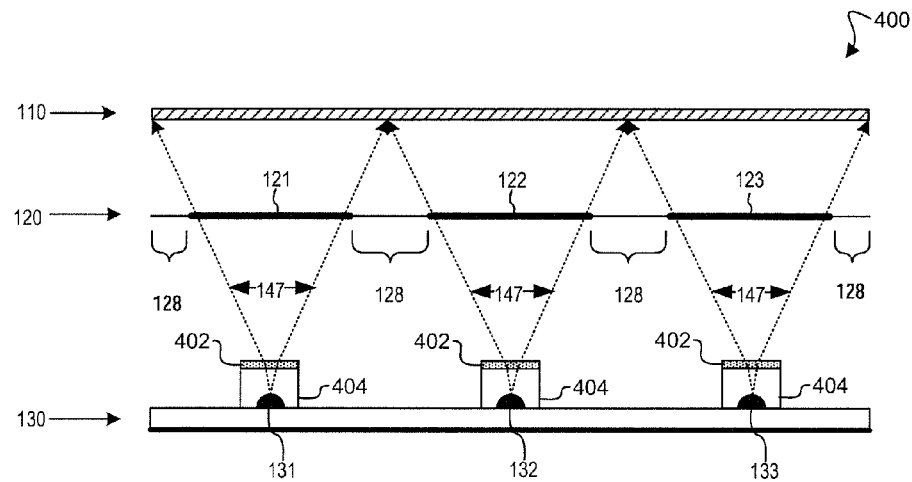
FIG. 4A is a cross-sectional view of an embodiment of a display apparatus.

FIG. 4A illustrates an embodiment of a display apparatus 400. Display apparatus 400 is in most respects similar to display apparatus 101 shown in FIG. 1C. In some embodiments of a display apparatus it can be desirable to include optical elements that condition the light emitted by the light sources before it is incident on the pixlets on the imaging layer. The primary difference between display apparatuses 101 and 400 is that display apparatus 400 includes optical elements 402 that are optically coupled to light sources 131, 132, and 133 so that light from each of light sources 131-133 passes through a corresponding optical element on the way to corresponding pixlets 121-123. In the illustrated embodiment there is a one-to-one correspondence between light sources an optical elements.

Optical elements 402 can be refractive, or diffractive optical elements and can have positive or negative optical power, so that they can collimate, focus, or otherwise alter the light beams emitted by light sources 131-133. Although illustrated as a single element, in another embodiment each optical element 402 can be a compound optical element made up of multiple subelements. In some embodiments the compound multiple subelements can be of the same type (refractive, diffractive, etc.), but in other embodiments the multiple subelements can be of different types—that is, the compound optical element can combine refractive and diffractive subelements, refractive subelements, and so on.

Each optical element 402 is positioned on illumination layer 130 and is supported above its corresponding light source by a structure 404. In one embodiment, structure 404 can be a ring-like structure that surrounds the light source and supports optical element 402 in the correct position above its corresponding light source. In other embodiments structure 404 need not completely surround its corresponding light source. In embodiments where structure 404 does surround its corresponding light source, the structure can be opaque to prevent cross-contamination of light sources—that is, to prevent light from one light source from straying, directly or indirectly, to a pixlet that corresponds to another light source.

In different embodiments, the light sources can be different types of sources including light emitting diodes (LEDs), small-aperture LEDs, lasers, fiber optics, and so on. In the illustrated embodiment, each light source 131, 132, and 133 is a light-emitting-diode ("LED") that emits light from a relatively small emission aperture. For example, LEDs with an emission aperture of 150-300 microns may be used. The LEDs can emit white display light in one embodiment, but blue LEDs, ultraviolet (UV) LEDs, or other LEDs of a different color/wavelength can be used in other embodiments. Each lamp 131, 132, and 133 is configured to emit a light beam toward its respective optical element 402. Optical elements 402 then define the limited angular spread of the light beams emitted from the lamps, and can also increase brightness uniformity of the display light propagating toward the pixlets. In some embodiments, for example, the intensity uniformity can be ±10 percent and the angular spread β (see FIG. 5A) can be limited to 45 degrees or 30 degrees.

Figure 4B:
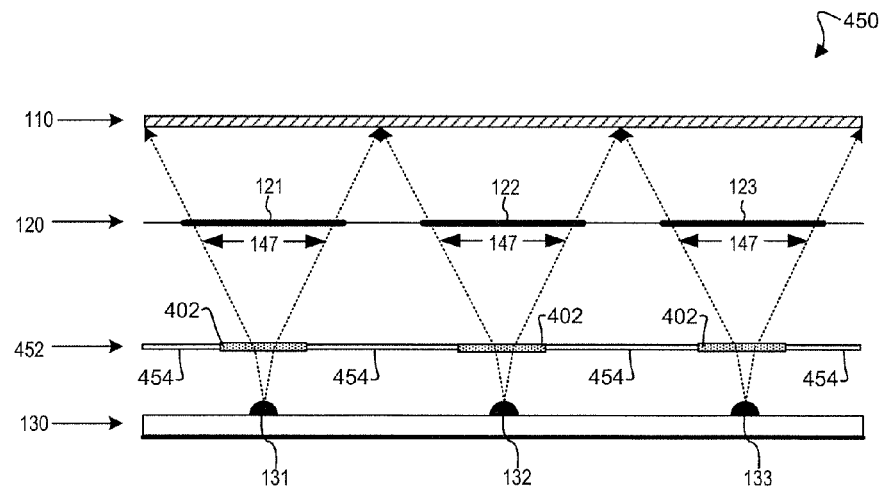
FIG. 4B is a cross-sectional view of another embodiment of a display apparatus.

FIG. 4B illustrates an embodiment of a display apparatus 450. Display apparatus 450 is in most respects similar to display apparatus 400: optical elements 402 are optically coupled to corresponding light sources 131, 132, or 133, and there is a one-to-one correspondence between light sources and optical elements. Optical elements 402 can have positive or negative optical power, such that they can collimate, focus, or otherwise alter the light beams emitted by corresponding light source 131-133, and can be refractive or diffractive, or some compound optical element. The primary difference between optical apparatuses 400 and 450 is that in display apparatus 450 optical elements 402 are positioned on a separate optical layer 452. Optical layer 452 is positioned between illumination layer 130 and display layer 120, so that light beams from light sources 131-133 pass through corresponding optical elements 402 on the way to their corresponding pixlets 121-123. In one embodiment, optical layer 452 can include interstitial spaces 454 between optical elements 402. In some embodiments, interstitial spaces 454 can be coated with a light-absorbing coating, such as black paint in one embodiment, to prevent reflection of light between layers that could cause light cross-contamination. As in display apparatus 400, in different embodiments the light sources can be of various kinds.

FIG. 5A is partial cross-section of display apparatus 400 illustrating its operation. The operation described is of a single light source/optical element/pixlet/screen combination, but other of these combinations on the display apparatus function similarly. During operation, light beams are emitted by light source 131 and pass through optical element 204. Optical element 204 applies its optical power, as well as its other optical characteristics, to condition the light beam output by light source 131 into divergent projection beam 147. Divergent projection beam 147 has a spread angle β, measured from the optical axis of optical element 402, such that the edge-to-edge spread angle of the divergent projection beam 147 is 2β. By appropriate design of the shape and optical characteristics of optical elements 402, the magnitude of β can be tightly controlled. The magnitude of β is generally determined by factors such as the size of the pixlet 121 to which optical element 402 is optically coupled, as well as the distance between optical element and pixlet. In some embodiments, it can be desirable for the magnitude of β to be such that all light in the divergent projection beam 147 is incident on the corresponding pixlet. In various embodiments, β can range from 0 degrees to 90 degrees, and in some embodiments from 0 degrees to 30 degrees or 0 degrees to 45 degrees.

FIGS. 5B-5C illustrate additional aspects of the operation of display apparatus 400. Generally there is a correlation between the aperture size of the light source in the resolution of the image: a smaller source generally produces a sharper image. As shown in FIG. 5C, for good resolution it can be useful to adjust the size of the light source so that the local divergence of the light—that is, the angle γ subtended at the display pixels by the light source—is small. In one embodiment, for example, γ can be 6 degrees or less, but in other embodiments it can be smaller, for example 1.7 degrees or less in one particular embodiment, and in still other embodiments it can be larger.

Figure 6A:
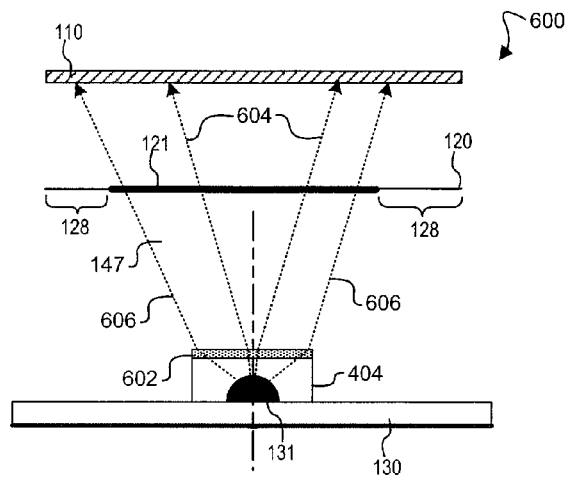
FIG. 6A is a partial cross-sectional view of an embodiment of a display apparatus of FIG. 4A including a uniforming optical element.
Figure 6B:
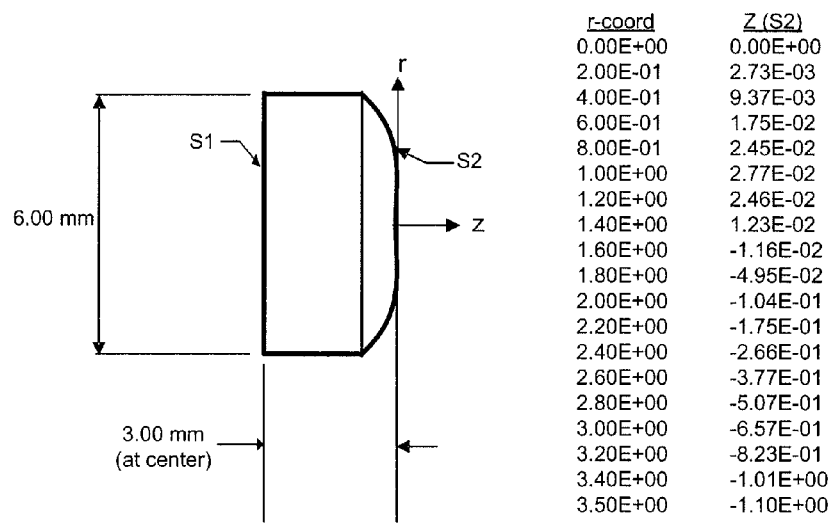
FIG. 6B is a cross-sectional view of an embodiment of a uniforming optical element.

FIGS. 6A-6B illustrate an embodiment of a display apparatus 600. Display apparatus 600 is in most respects similar to display apparatus 400. The primary difference between display apparatuses 400 and 600 is that display apparatus 600 includes a uniforming optical element 602—that is, an optical element designed to provide uniform illumination of its corresponding pixlet. Without uniforming optical element 602, light at the edges of pixlet 121 would be dimmer compared to the center due to three factors: the incident angle on the screen, the apparent size of the source as seen from this angle and the increased distance to the screen. Uniforming optical element 602 makes illumination of pixlet 121 more uniform by having the center of optical element 602 collect a small cone of rays from light source 131 spread it out to a larger cone, as illustrated with rays 604. Likewise, at or near its edges optical element 602 can take a large cone of rays at a high angle and bend it inward to make it smaller, as illustrated with rays 606. Put differently, optical element 602 is designed to apply negative optical power near its center and positive optical power near its edges.

FIG. 6B illustrates an embodiment of a refractive uniforming optical element 602 that can be used in display apparatus 600. The illustrated embodiment is substantially cylindrical in shape and has a substantially flat first surface S1 that will be in contact with the light source aperture and a second surface S2 whose z coordinates are defined by the equation:

$$z = \frac{cr^2}{1 + \sqrt{1 - (1+k)c^2 r^2}} + \sum_{i=1}^{N} \alpha_i \rho^i$$

where $r^2 = x^2 + y^2$, $\rho = r$, and c is the curvature of surface S2, defined as $c = 1/R$ where R is the radius of surface S2, and k and $\alpha i$ are coefficients. In one particular embodiment, the values of the coefficients k and $\alpha i$ are given in the following table:

| Coefficient | Surface | |
| --- | --- | --- |
| | S1 | S2 |
| C | 0 | 0.13429898 |
| K | 0 | 0 |
| α1 | | 0 |
| α2 | | 0.010499324 |
| α3 | | −0.046097216 |
| α4 | | −4.6210965E−3 |
| α5 | | 3.1405504E−4 |
| α6 | | 1.8297661E−4 |
| α7 | | 3.3705639E−6 |
| α8 | | 9.8246009E−6 |
| α9 | | −2.271147E−6 |

Figure 7:
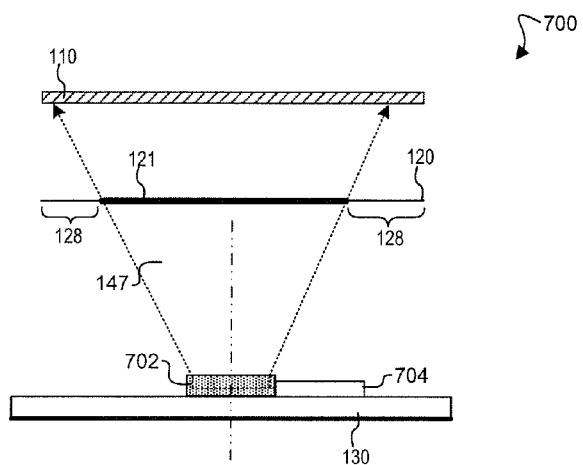
FIG. 7 is a partial cross-sectional view of another embodiment of a display apparatus.

FIG. 7 illustrates a partial cross-section of an embodiment of a display apparatus 700. Display apparatus 700 is similar in many respects to display apparatus 400. The primary difference between display apparatuses 400 and 700 is the light source. Display apparatus 700 uses a laser 704 as a light source. Laser 704 is positioned on illumination layer 130 and is side-coupled to optical element 702. In the illustrated embodiment, optical element 702 is a diffractive optical element configured to couple laser light in on the edge and distribute it to be emitted from the diffractive optic, parallel ±0.5% to an optical axis of the diffractive optic, and then continuously and incrementally larger angles with linear variation to the edge of the optic, where it emerges on the right and left sides at its largest angle β (e.g., 45 degrees) with a local divergence of 0.5 degrees. In one embodiment, a diffractive optical element 702 can be obtained from Ergophos LLC, but other diffractive optics can also be used. Having local-low-divergence display light from the light sources (e.g., 0.5 degrees) can be helpful in maintaining image integrity in sub-images that are projected onto screen layer 110. In other embodiments, different types of lasers and different optical elements can be used and, moreover, they can be optically coupled differently than shown and described. For example, in one embodiment the optical element need not be diffractive and the laser need not be side-coupled to the optical element.

Figure 8:
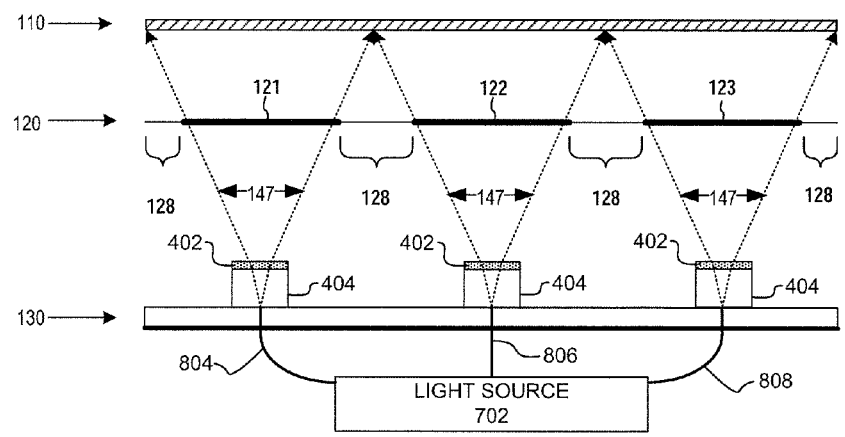
FIG. 8 is a partial cross-sectional view of another embodiment of a display apparatus.

FIG. 8 illustrates an embodiment of a display apparatus 800. Display apparatus 800 is similar in many respects to display apparatus 400. The primary difference between display apparatuses 400 and 800 is that display apparatus 800 uses optical fibers 804, 806, and 808 as light sources on the illumination layer. One end of each optical fiber is positioned in illumination layer 130, oriented to emit a light beam from its fiber core toward its corresponding optical element 402 and its corresponding pixlet, while the other end of each fiber is coupled to a light source 802. In operation, light is injected into each optical fiber by light source 802. Light travels through each optical fiber until it reaches the fiber end, where it is emitted as a beam from the fiber core toward optical elements 402 and the corresponding pixlet. In other embodiments, optical fibers 804, 806, 808 need not use the same light source 802, but can instead use different light sources.

The above descriptions of embodiments of the invention, including what is described in the abstract, is not intended to be exhaustive or to limit the invention to the disclosed forms. Specific embodiments of, and examples for, the invention are described herein for illustrative purposes, but various modifications are possible within the scope of the invention, as those skilled in the relevant art will recognize.

These modifications can be made to the invention in light of the above detailed description. The terms used in the claims that follow should not be interpreted to limit the invention to the specific embodiments disclosed in the specification. Rather, the scope of the invention should be determined entirely by the following claims, construed in accordance with established legal doctrines of claim interpretation.

The invention claimed is:

1. A display apparatus comprising:
    a screen layer for displaying a unified image to a viewer on a viewing side of the screen layer that is opposite a backside of the screen layer;
    an illumination layer having an array of light sources, wherein each light source emits a light beam;
    an array of optical elements, each optical element optically coupled to a corresponding light source in the array of light sources;
    a display layer disposed between the screen layer and the illumination layer, the display layer comprising:
        a matrix of pixlets, and
        a spacing region disposed between the pixlets in the matrix, wherein the array of light sources are positioned to emit their light beams through the array of optical elements, wherein each optical element is configured to shape the received light beam into a divergent projection beam having a limited angular spread to project sub-images displayed by the pixlets as magnified sub-images on the backside of the screen layer, the magnified sub-images to combine to form the unified image that is substantially seamless.

2. The display apparatus of claim 1 wherein the array of optical elements comprises a plurality of optical elements positioned on the illumination layer.

3. The display apparatus of claim 1 wherein the array of optical elements comprises a plurality of optical elements positioned on an optical layer between the illumination layer and the display layer.

4. The display apparatus of claim 1 wherein the optical elements have optical power.

5. The display apparatus of claim 4 wherein the optical elements are diffractive or refractive.

6. The display apparatus of claim 1 wherein the divergent projection beam has a selected spread angle.

7. The display apparatus of claim 6 wherein the selected spread angle is from 30 degrees to 45 degrees.

8. The display apparatus of claim 1 wherein the optical element is a uniforming optical element that creates a beam of substantially uniform intensity incident on the corresponding pixlet.

9. The display apparatus of claim 8 wherein the local divergence is less than 0.5 degrees.

10. The display apparatus of claim 1 wherein the light sources are optical fibers with one end positioned on the lighting layer and another end coupled to a light source.

11. The display apparatus of claim 1 wherein each light source is a laser.

12. The display apparatus of claim 11 wherein each laser is coupled to a diffractive optical element.

13. The display apparatus of claim 1 wherein each light source is a light-emitting diode (LED).

14. The display apparatus of claim 13 wherein each LED is a small-aperture LED.

15. A multi-panel display comprising:
    a plurality of tileable displays arranged to form the multi-panel display, each tileable display comprising:
        a screen layer for displaying a unified image to a viewer on a viewing side of the screen layer that is opposite a backside of the screen layer;
        an illumination layer having an array of light sources, wherein each light source emits a light beam;
        an array of optical elements, each optical element optically coupled to a corresponding light source in the array of light sources; and
        a display layer disposed between the screen layer and the illumination layer, the display layer comprising:
            a matrix of pixlets,
            a spacing region disposed between the pixlets in the matrix, and
            a spacing region disposed between the pixlets in the matrix, wherein the array of light sources are positioned to emit their light beams through the array of optical elements, wherein each optical element is configured to shape the received light beam into a divergent projection beam having a limited angular spread to project sub-images displayed by the pixlets as magnified sub-images on the backside of the screen layer, the magnified sub-images to combine to form the unified image that is substantially seamless, wherein the unified images from each tileable display combine to form an overall image displayed by the multi-panel display.

16. The multi-panel display of claim 15 wherein the array of optical elements comprises a plurality of optical elements positioned on the illumination layer.

17. The multi-panel display of claim 15 wherein the array of optical elements comprises a plurality of optical elements positioned on an optical layer between the illumination layer and the display layer.

18. The multi-panel display of claim 15 wherein the optical elements have optical power.

19. The multi-panel display of claim 18 wherein the optical elements are diffractive or refractive.

20. The multi-panel display of claim 15 wherein the divergent projection beam has a selected spread angle.

21. The multi-panel display of claim 15 wherein the optical element is a uniforming optical element that creates a beam of substantially uniform intensity incident on the corresponding pixlet.

22. The multi-panel display of claim 1 wherein the light sources are optical fibers with one end positioned on the lighting layer and another end coupled to a light source.

23. The multi-panel display of claim 15 wherein each light source is a laser.

24. The multi-panel display of claim 23 wherein each laser is coupled to a diffractive optical element.

25. The multi-panel display of claim 15 wherein each light source is a light-emitting diode (LED).

26. The multi-panel display of claim 25 wherein each LED is a small-aperture LED.

27. A display apparatus comprising:
a screen layer for displaying a unified image to a viewer on a viewing side of the screen layer that is opposite a backside of the screen layer;
an illumination layer having an array of light sources, wherein each light source in the array is configured to emit a divergent projection beam having a limited angular spread; and
a display layer disposed between the screen layer and the illumination layer, the display layer comprising:
a matrix of pixlets; and
a spacing region disposed between the pixlets in the matrix, wherein the array of light sources are positioned to emit the divergent projection beams having limited angular spread to project sub-images displayed by the pixlets as magnified sub-images on the backside of the screen layer, the magnified sub-images to combine to form the unified image that is substantially seamless.

28. The display apparatus of claim 27, further comprising an array of optical elements, each optical element optically coupled to a corresponding light source in the array of light sources, wherein the array of light sources are positioned to emit their light beams through the array of optical elements, wherein the optical elements are configured to shape the received light beam into the divergent projection beams.

29. The display apparatus of claim 28 wherein the array of optical elements comprises a plurality of optical elements positioned on the illumination layer.

30. The display apparatus of claim 28 wherein the array of optical elements comprises a plurality of optical elements positioned on an optical layer between the illumination layer and the display layer.

* * * * *